2,921,879

METHOD OF PRODUCING CONIDENDRIN

August Wilhelm Sohn, Mannheim-Waldhof, Germany, assignor to Zellstofffabrik Waldhof, Mannheim-Waldhof, Germany No Drawing. Application May 31, 1955
Serial No. 512,336

Claims priority, application Germany May 29, 1954

3 Claims. (Cl. 162—14)

The present invention relates to methods of producing conidendrin and more particularly to methods of producing high quality chemical and semi-chemical cellulose pulps from raw materials from which cellulose could hitherto not be extracted economically, while simultaneously obtaining conidendrin and similar substances from the raw material.

Many methods are known for the production of cellulose. A large group of these methods comprise the treatment of the cellulose raw material with a $SO_2$-containing cooking liquor, generally in a closed vessel, until the raw material is completely digested. When wood is utilized as the starting material, the resins contained in the wood form very unpleasant disturbance sources which interfere with the obtaining of the cellulose. Particularly when utilizing fresh wood, the resins are removed from the woody substance by the decomposition but only go to an extremely small extent into solution in the cooking liquor while the greatest portion sticks to the obtained product and prevents simple working up of the same.

It is therefore generally necessary to store wood for a long time before extracting cellulose therefrom, since it has been shown that the de-resinification of the obtained product is easier if the wood is stored, though it is not certain whether or not this is due to the resin portion vaporizing upon storage or being converted upon storage to compounds which upon decomposition of the wood do not take a form which renders removal thereof difficult. However, in this case there is the important disadvantage of requiring large storage facilities and due to this the price of the finished product is necessarily increased.

It has been attempted to avoid these difficulties by the extraction of the resinous constituents from the wood before the decomposition thereof. However, processes of this type are so cumbersome and uneconomical that they have found no place in the industry up until the present time.

It has also been necessary up to the present to aid in the methods of obtaining cellulose from wood which has been storaged long periods of time by treating the same with steam or hot water or by mechanical devices in order to free the same from troublesome impurities.

It is therefore a primary object of the present invention to provide a method of producing pulp from wood or other cellulose-containing raw materials whereby all of the above enumerated disadvantages of the prior art may be avoided.

It is still another object of the present invention to provide a method of producing cellulose from raw materials such as especially fresh wood, knotted wood, branches and the like, whereby the cellulose may be extracted in high yield and purity in an economical and easily controllable manner.

It is another object of the present invention to provide a method of producing cellulose from raw materials which could hitherto not be utilized economically for this purpose, and to simultaneously obtain conidendrin and other substances from the raw material.

It is a further object of the present invention to provide a method of producing chemical or semi-chemical pulps starting with raw materials which could not be utilized for this purpose prior to the present invention.

Other objects and advantages of the present invention will be apparent from a further reading of the specification and of the appended claims.

It has been found according to the present invention that while conidendrin during the digestion of cellulose raw material with sulfite liquor is formed from a previous or initial substance existing in the cellulose raw material, a part only of the conidendrin is dissolved in the sulfite liquor, another part sticking to the obtained cellulose product from which it may be recovered by extraction. Furthermore, it has been found according to the present invention that the prevailing amount of the previous or initial substance from which conidendrin is formed during the digestion of the cellulose raw material is contained in those parts of the raw material which are difficulty convertible to pulp by digestion with acid sulfite liquors, e.g. knotted wood, branches and the like, though these constitute a small part only of the wood by weight, and that, therefore, by separating the said parts of the raw material after digestion from the pulp converted product which is the main body from the separated parts, of the material, as knotted wood, branches and the like conidendrin may be recovered by extraction in a very good rate and in an economic manner, whilst in the more completely convertible main parts of the wood there is nothing at all or a small quantity only of the previous of initial substance for conidendrin and, therefore, in the cooked product of these main parts of the wood there is no conidendrin at all or but a small quantity. Further, it has been found according to the present invention, that also in fresh wood there are contained must greater quantities of the previous or initial substance for conidendrin than is in wood which has been stored a longer time.

Thus, with the above objects in view, the present invention mainly consists in a method of producing pulp, comprising the steps of digesting a fibrous cellulose-containing raw material containing a previous or initial substance for conidendrin from which by treating it with acids conidendrin is formed with an acid sulfite cooking liquor, thereby obtaining a reaction mass including digested cellulose-containing material containing also conidendrin, and also including waste sulfite liquor, and subjecting the digested cellulose-containing material to extraction with an organic liquid in which conidendrin is soluble, thereby obtaining an extract solution containing conidendrin, and a cellulosic pulp.

If it is desired to obtain a substantially pure cellulose pulp, e.g. a chemical pulp, the raw material is cooked with the acid sulfite liquor until the raw material would be substantially completely digested, e.g. until the lignins, pentosans, hemi-celluloses and the like are substantially freed, and then the digested product is subjected to extraction with a solvent for conidendrin.

If it is desired to obtain a semi-chemical pulp, the cooking conditions are adjusted so as to be somewhat milder. In other words the digestion is such that the substantially little lignins, pentosans and other hemi-celluloses are dissolved in the liquor, but only so that the fiber bundles are softened and loosened. The treated product is then subjected to extraction with the solvent for conidendrin according to the present invention to obtain the final pulp which may be afterwards worked up in the usual manner to the desired product.

The term "cellulosic pulp" as used throughout the entire specification and claims is therefore meant to include both true cellulose pulps, e.g. chemical pulps, and the so called semi-chemical pulps, the method of the present invention being adapted equally well for the production of either of these products.

Although the present invention is described mainly with reference to the production of conidendrin and also cellulose from poor quality starting materials such as fresh wood, knotty wood, branches and the like, it is to be understood that the present invention is equally applicable to the treatment of high quality starting materials since even the highest quality starting materials also contain at least some portions which are difficult to convert to cellulosic pulp by the digestion treatment. In accordance with the present invention these portions, after the digestion treatment with acid sulfite cooking liquor, can be separated from the waste liquor and the produced pulp, and then subjected to extraction with a solvent for conidendrin. After the extraction with the solvent, these portions may be further worked up either separately or together with the rest of the pulp produced directly by the cooking with the acid sulfite cooking liquor.

The digestion or cooking treatment with the acid sulfite cooking liquor is carried out in the usual manner utilizing normal cooking liquors with usual compositions, and normal amounts thereof, normal temperatures and pressures, normal treatment times, etc. For example, the cooking liquor may be a calcium sulfite or calcium bisulfite, cooking liquor containing excess free $SO_2$, a magnesium sulfite cooking liquor, an alkali bisulfite cooking liquor, ammonium sulfite cooking liquor or the like. In view of the fact that all of such cooking liquors are well known and further in view of the great amount of literature in this field, it is believed to be unnecessary to be more specific as to the composition, $SO_2$ content, temperature, duration of cooking treatment, ratio of cooking liquor to wood, pH value, etc. since these values vary depending upon the particular treatment in question. It is only necessary in accordance with the present invention that the cooking liquor be acid, e.g. pH under 6.8, in order to make the conidendrin in the wood be extractable by the organic solvent therefor.

Any solvent for conidendrin may be utilized in accordance with the present invention. Halogenated hydrocarbons such as brominated, fluorinated and chlorinated hydrocarbons, and most preferably chlorinated aliphatic hydrocarbons such as dichloromethane and trichloroethane have been found to be most suitable for the extraction of the conidendrin from the acid sulfite liquor-digested conidendrin-containing material.

Among the other solvents for conidendrin are other halogenated hydrocarbons such as methylene chloride, chloroform, carbon tetrachloride, ethylene chloride, perchloroethylene, chloropropane, 1,5-dichloropentane, chlorobenzene, bromobenzene, n-propyl bromide, and methyl iodide; aliphatic hydrocarbons such as petroleum ether; cycloaliphatic hydrocarbons such as cyclohexane and dipentene; aromatic hydrocarbons such as benzene, xylenes, diphenyl, and diphenyl methane; ethers such as ethyl ether, B,B'-dichloroethyl ether, n-propyl ether, isopropyl ether, n-butyl ether, n-amyl ether, iso-amyl ether, eugenol and guaiacol; nitro compounds such as nitromethane, nitroethane, 2-nitropropane and nitrobenzene; carbonyl compounds such as butyraldehyde, furfural, benzaldehyde, diisobutyl ketone and mesityl oxide; esters such as ethyl acetate, ethyl malonate, ethyl acetoacetate, ethyl salicylate, ethyl succinate, ethyl benzoate, isoamyl salicylate and n-amyl propionate; liquid fatty acids such as n-caprylic acid and oleic acid; amines such as piperidine and triethyl tetramine; alcohols such as methanol, ethanol, propanol, butanol, isoamyl alcohol, tetrahydrofurfural alcohol and lauryl alcohol; phenols such as cresol, o-secondary amyl phenol and di-secondary amyl phenol; and miscellaneous liquid organic solvents such as carbon disulfide and lauryl mercaptan.

According to a further embodiment of the present invention, in addition to extracting the conidendrin from the acid sulfite liquor-digested material, other resins are also extracted. Among these other resins are polyphenols which include conidendrin as a part of the molecule, as well as polymers of conidendrins. In addition, non-phenolic resins such as terpenes or carbohydrates are also extracted in accordance with this embodiment of the invention.

The extraction of the conidendrin by means of the solvent therefor generally also results in the extraction of at least a portion of the other resins of the acid sulfite liquor-digested material. However, in accordance with a preferred embodiment of the present invention, mixtures of solvents may be utilized to more fully achieve the extraction of the other resins along with the conidendrin from the digested material. The lower alcohols such as methanol and ethanol are particularly suitable as solvents for the valuable phenolic resins other than conidendrin.

In accordance with a preferred embodiment of the present invention, the conidendrin is first extracted in a first step with a suitable specific solvent therefore such as the chlorinated aliphatic hydrocarbon and subsequently extracted with another solvent in which the other phenolic resinous substances are soluble, e.g. with a lower alcohol. The lower saturated aliphatic alcohols are more preferred for this purpose.

The amount of solvent utilized in extracting the conidendrin and the other phenolic resins from the acid liquor-digested material may vary greatly depending upon the particular material, the particular solvent, whether or not the extraction is carried out continuously or discontinuously, whether or not the extraction is carried out in countercurrent, etc. In general, for a discontinuous operation, best results have been obtained utilizing the solvent in an amount of 5 to 6 times the amount of the dry material. Of course, other proportions may be used with good results.

The elimination of the extract solution from the chemical cellulose pulp or semi-chemical pulp may be accomplished in any desired way. It is for instance possible to first squeeze out the solution, thereafter to again wash the chemical cellulose pulp with fresh solvent, possibly in countercurrent, and to distill the remainder of the solvent from the pulp. However, it is also possible to for instance displace the solvent with water or with a different solvent.

The obtaining of the conidendrin and the other phenolic resins from the extract solution or solutions may be accomplished in any desired way.

It has been found according to the present invention that conidendrin can be obtained with especially high yields from incompletely decomposed portions of the wood such as branches, knots and the like, which may be separated from the decomposition product by mechanical separation. This particularly high yield can be obtained because it was found that the concentration of conidendrin is especially high in the incompletely decomposed portions of the wood.

According to a special embodiment of the present invention, wood is decomposed with $SO_2$-containing cooking liquor. The decomposition product is separated, the formed pulp being separated from the waste liquor and the non-completely decomposed portions of the wood such as the knots and the like, the knots and the like also being separated from the waste liquor. The incompletely decomposed portions are then extracted as described above. From the extract solution or solutions the conidendrin and possibly other phenolic resins are obtained. The thus extracted wood portions are then again united with the other decomposed portions and together with the same utilized as chemical cellulose pulp or semi-chemical pulp.

By proceeding in this way the advantage is gained that the conidendrin and possibly other phenolic resins are obtained in an especially economical manner, because these materials are particularly highly concentrated in branches, knots and the like. Therefore, if it is not important to obtain all of the conidendrin and possibly of the other valuable phenolic resins, it is sufficient to extract the same from the branches, knots and the like.

If however most complete recovery of the conidendrin and possibly of the other valuable phenolic resins is to be stressed and in order to obtain very clean chemical cellulose pulp or semi-chemical pulp, it is also possible in accordance with the present invention to proceed as follows: Wood is decomposed with $SO_2$-containing cooking liquor. The products of decomposition are sorted in customary manner. The incompletely decomposed portion and the pulp produced directly by the treatment with the acid sulfite liquor are extracted separately, again reunited after extraction and jointly further worked up to chemical cellulose pulp or semi-chemical pulp. Conidendrin and possibly other phenolic resins may be separately obtained from the different extract solutions. However, it is also possible to combine the extract solutions obtained from the incompletely decomposed portion and from the completely decomposed portion and to jointly work up these combined solutions.

It is especially advantageous to execute the extraction in a continuous manner. One-step as well as multi-step extractions, joint extractions of the entire decomposition products, and separate extraction of incompletely decomposed portions and fully decomposed portions can be advantageously executed in a continuous manner.

It has been found especially advantageous to use fresh wood starting material in accordance with the present invention. It has been found that the decomposition of fresh wood is especially smooth and produces less waste in the form of branches and knots, and that in spite of this, by using the method of the present invention a perfect product can be obtained without additional difficulties. Furthermore it has been found that from fresh wood after decomposition a particularly large quantity of valuable conidendrin can be obtained.

The thus obtained chemical cellulose pulp may be further processed to paper, artificial silk or the like. The semi-chemical pulp obtained in accordance with the present invention can also be further processed to paper, paper board, or the like. The further processing of the products obtained in accordance with the present invention is facilitated in comparison with the processing of known products due to the absence of troublesome impurities. A special advantage of the product obtained in accordance with the present invention is their excellent bleachability. Since the removed impurities have great affinity for oxygen and therefore use up considerable quantities of oxygen, the products from which these impurities have been removed consume considerably smaller quantities of bleached materials than comparable known products. Moreover, because of the possibility of bleaching with less strong bleach methods, otherwise caused damage to the fibers is largely avoided.

The thus obtained conidendrin is an excellent product that can easily be separated from the excess solution in clean form. It can then, without difficulties, be further processed to valuable technical products, such as deoxidants for fats and oils, products for the prevention of aging of rubber, plastics, tanning agents and medicines.

The other phenolic resins too can in various ways be processed into valuable products.

The following examples are given to further illustrate the method of the present invention. It is to be understood however, that the scope of the present invention is not meant to be limited to the specific details of the examples.

EXAMPLE I 10 tons of stored seasoned pine wood are mixed with a calcium bisulfite cooking liquor containing 5.0% $SO_2$ and 1.0% CaO, in a ratio of 1:5, that is 1 part of absolutely dry wood to 5 parts of bisulfite solution. The mixture is introduced into a pressure vessel, heated to 110° C. and maintained at this temperature for one hour. It is then further heated to 130° C. and maintained at this temperature until the degree of decomposition according to the Rochier number has reached 40. The Rochier number of 40 means that the cellulose requires 40 seconds to use up a predetermined, always the same, amount of permanganate. This results in a so called "hard" cellulose, that is such which has a definite though only a very small amount of lignin contained therein and because of this quickly uses up the permanganate.

The decomposition product is separated from the cooking solution and washed. 5 tons of absolutely dry cellulose pulp is thus obtained. Thereupon the splinters (branches and knots) in an amount of 150 kg. are separated from the cellulose pulp. The splinters are coarsely ground in a mill and by filtration brought to a content of about 50% dry substance.

The wet coarsely ground splinters of branches and knots are extracted with dichloromethane in a ratio of 1:5, that is 1 part of dry material to 5 parts of solvent. The extraction is carried out continuously in a tubular apparatus at or about the boiling temperature of the solvent. The solvent is continuously distilled off and the conidendrin separated from the distillate by cooling. The water distilled off with the dichloromethane separates from the same and is continuously drawn off.

The thus extracted ground splinter substances are in a second extraction step in a similar apparatus and under the same conditions and in the first extraction step extracted with methanol. This results in separation of a resinous product from the distillate.

After completion of the extraction, the solvent is completely driven off from the ground splinters which are thereupon mixed with the rest of the cellulose from which the splinters had originally been separated and then purified and worked up together with the cellulose to the same product, namely in this case paper.

From the extract solution there is obtained 921 g. of conidendrin and 3165 g. of resin. The analysis of the conidendrin shows 67.0% C, 5.9% H and 17.9% $OCH_3$. The analysis of the other resinous substances shows 58.9% C, 6.0% H and 12.8% $OCH_3$. It consists approximately up to one half of polymers of conidendrin and polyphenols which are chemically related to conidendrin, while the other half consists of non-phenolic compounds of terpene and carbohydrate character.

EXAMPLE II 10 tons of stored pine wood are digested as in Example I, with the same bisulfite solution as in Example I, however until a Rochier number of 55 is obtained. The formed cellulose is called "medium hard" cellulose. This is obtained in a yield of 4.75 tons of absolute dry material. After washing, 144 kg. of splinters of knots and branches are separated therefrom.

The splinter material is extracted as in Example I whereby there is obtained 3460 g. of conidendrin and 2745 g. of resin of substantially the same composition as in Example I.

After the extraction of the conidendrin and the resins from the splinter material, the same is in the form of cellulose pulp which is then mixed with the rest of the cellulose pulp and purified and worked up to paper.

EXAMPLE III 10 tons of stored pine wood is treated with the same calcium bisulfite solution as in Examples I and II, however until a Rochier number of 90 is achieved. The resulting cellulose is designated as "soft" cellulose, that is one which is very pure and therefore uses up the permanganate only very slowly. 4.55 tons of absolutely dry cellulose is obtained from which about 137 kg. of splinters of knots and branch material are sorted out.

The splinter material is extracted as in Examples I and II whereby 4255 g. of conidendrin and 8357 g. of resins of about the same composition as in Examples I and II are obtained.

The extracted splinter material, which after extraction is cellulose pulp, is mixed with the rest of the cellulose pulp, purified and further worked up to make paper.

EXAMPLE IV 10 tons each of fresh, unstored pine wood, and pine wood which has been stored for one year, are treated in the same way, as follows:

The wood is first mechanically divided into a good wood portion and a knotty wood portion. From each 10 tons, e.g. from the 10 tons of stored wood and from the 10 tons of fresh wood, there is obtained 9.7 tons of good wood and 0.3 ton of knotty wood pieces. These portions are separately treated with the same calcium bisulfite solution and in the same manner as in Example III, whereupon the treated material is as in the previous examples extracted first with trichloroethylene and then with methanol.

With the wood which has been stored for one year no conidendrin and 44.1 kg. of resin is obtained by the extraction from the good wood portion while from the knotty wood pieces 2.46 kg. of conidendrin and 3 kg. of resin is obtained by the extraction with the trichloroethylene and methanol.

With the fresh wood, there is likewise obtained no conidendrin and in this case 66.2 kg. of resin from the good wood portion by the extraction thereof with the solvents. From the knotty wood pieces there is obtained by the extraction with the solvents 24.12 kg. of conidendrin and 6 kg. of resin.

The good wood portions, and the knotty wood pieces after extraction of the same, are together purified and worked up to paper.

The following tables summarize the yields of conidendrin and resin in this example:

*Example I*

| Type of Decomposition | Percent Conidendrin | Percent Resin |
| --- | --- | --- |
| Hard Cellulose | 0.6 | 2.1 |
| Medium Hard Cellulose | 2.4 | 1.9 |
| Soft Cellulose | 1.1 | 7.8 |

*Table II*

| | Percent Conidendrin | Percent Resin |
| --- | --- | --- |
| A. From the fresh wood: | | |
| From the good wood portion | | 1.5 |
| From the knotty wood pieces | 17.7 | 4.4 |
| B. From the 1 year stored wood: | | |
| From the good wood portion | | 1.0 |
| From the knotty wood pieces | 1.8 | 2.2 |

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing conidendrin from a fibrous cellulose-containing raw material including a first portion containing a relatively large percentage amount of a substance adapted to form conidendrin upon acid treatment, said first portion being relatively difficult to convert to cellulosic pulp by digestion with an acid sulfite cooking liquor, and also including a second portion containing a smaller percentage amount of said substance and being more easily convertible to cellulosic pulp by digestion with an acid sulfite cooking liquor, comprising the steps of digesting said fibrous cellulose-containing raw material with an acid sulfite cooking liquor so as to form a reaction mass including cellulosic pulp of said second portion and to form conidendrin-containing at least partially digested cellulosic material of said first portion; separating said conidendrin-containing cellulosic material from the remainder of said reaction mass; subjecting said separated conidendrin-containing cellulosic material to extraction with an organic liquid in which conidendrin is soluble so as to form a conidendrin-containing solution; and recovering conidendrin from said solution.

2. A method of producing conidendrin from a fibrous cellulose-containing raw material including a first portion containing a relatively large percentage amount of a substance adapted to form conidendrin upon acid treatment, said first portion being relatively difficult to convert to cellulosic pulp by digestion with an acid sulfite cooking liquor, and also including a second portion containing a smaller percentage amount of said substance and being more easily convertible to cellulosic pulp by digestion with an acid sulfite cooking liquor, comprising the steps of separating said first portion; at least partially digesting said separated first portion with an acid sulfite cooking liquor so as to form conidendrin of said substance contained therein; and subjecting said at least partially digested conidendrin-containing first portion to extraction with an organic liquid in which conidendrin is soluble, thereby separating said conidendrin from said at least partially digested first portion.

3. In a method of producing conidendrin from a fibrous cellulose-containing raw material including a first portion containing a relatively large percentage amount of a substance adapted to form conidendrin upon acid treatment and also containing other resins in a state not extractable with acid sulfite cooking liquor, said first portion being relatively difficult to convert to cellulosic pulp by digestion with an acid sulfite cooking liquor, said raw material also including a second portion containing a smaller percentage amount of said substance and being more easily convertible to cellulosic pulp by digestion with an acid sulfite cooking liquor, comprising the steps of digesting said fibrous cellulose-containing raw material with an acid sulfite cooking liquor so as to form cellulosic pulp of said second portion and to form conidendrin and other resins containing at least partially digested cellulosic material of said first portion; separating said conidendrin-containing cellulosic material from the remainder of the reaction mass; subjecting said separated conidendrin-containing cellulosic material to extraction with a liquid halogenated hydrocarbon in which conidendrin is soluble, thereby obtaining an extract solution containing conidendrin and a digested partially extracted cellulose-containing material containing said other resins; and subjecting said digested partially extracted cellulose-containing material to extraction with an organic liquid in which said other resins are soluble, thereby obtaining an extract solution containing said other resins, and also obtaining a cellulosic material substantially free of said conidendrin and said other resins.

References Cited in the file of this patent

UNITED STATES PATENTS

| | | |
| --- | --- | --- |
| 2,022,654 | Dreyfus | Dec. 3, 1935 |
| 2,538,457 | Hudson | Jan. 16, 1951 |